United States Patent [19]

Joyner et al.

[11] 4,375,540

[45] Mar. 1, 1983

[54] POLYESTER MODIFIED WITH ALKYL- OR ALKENYLSUCCINIC ANHYDRIDES

[75] Inventors: Frederick B. Joyner; Jimmy R. Trotter; Richard L. McConnell, all of Kingsport, Tenn.

[73] Assignee: Eastman Kodak Company, Rochester, N.Y.

[21] Appl. No.: 297,817

[22] Filed: Aug. 31, 1981

[51] Int. Cl.³ .............................................. C08G 63/16
[52] U.S. Cl. .................................. 528/302; 528/295; 528/295.3; 528/295.5; 528/307; 528/308
[58] Field of Search ............... 528/295, 302, 307, 308, 528/295.3, 295.5

[56] References Cited

U.S. PATENT DOCUMENTS

| | | | |
|---|---|---|---|
| 3,076,787 | 2/1963 | Johnson et al. | 528/308 X |
| 3,932,358 | 1/1976 | de Cleur et al. | 528/308 X |
| 4,122,073 | 10/1978 | Georgoudis | 528/302 X |
| 4,124,571 | 11/1978 | Georgoudis | 528/302 X |
| 4,252,940 | 2/1981 | Sublett | 528/302 |

*Primary Examiner*—Lucille M. Phynes
*Attorney, Agent, or Firm*—William P. Heath, Jr.; Daniel B. Reece, III

[57] ABSTRACT

Copolyesters derived from aromatic, cycloaliphatic or aliphatic dibasic acid moieties; aliphatic or cycloaliphatic glycol moieties including at least 10 mole % of 1,6-hexanediol moieties; and 2 to 40 mole % of an alkyl or alkenylsuccinic anhydride moiety. The copolyesters are useful as bonding or coating compositions.

4 Claims, No Drawings

POLYESTER MODIFIED WITH ALKYL- OR ALKENYLSUCCINIC ANHYDRIDES

FIELD OF THE INVENTION

This invention is a class of new, linear copolyesters which contain about 2% or more of one or more alkylsuccinic anhydrides or alkenylsuccinic anhydrides which are chemically combined in the polyester molecule. The copolyesters generally contain crystallizable moieties with crystalline melting points of about 70° C. to about 200° C. These copolyesters are useful as coatings or as adhesives for bonding fabrics, metals, plastics, wood and the like.

BACKGROUND ART

U.S. Pat. No. 3,542,737 discloses poly(ethylene terephthalate) polymers containing up to 15 mole percent of a substituted succinic anhydride, the polymers being useful to produce high melting films and fibers. U.S. Pat. No. 3,890,279 discloses thermoplastic copolyester elastomers derived from terephthalic acid or 2,6-naphthalenedicarboxylic acid, an alkyl or alkenylsuccinic anhydride (side chain=7 to 30 carbon atoms) and 1,4-butanediol. U.S. Pat. No. 3,891,604 discloses segmented thermoplastic copolyetheresters derived from poly(tetramethylene ether)glycol, glycols containing 2 to 8 carbon atoms, alkyl or alkenyl succinic anhydrides and $C_8$ to $C_{16}$ aromatic dicarboxylic acids. None of these prior art patents disclose relatively low melting copolyesters useful as adhesives.

DISCLOSURE OF THE INVENTION

This invention is a bonding or coating composition comprising copolyesters having a melting point of about 70° C. to about 200° C. and an inherent viscosity of about 0.4 to about 1.2, said copolyester containing the following divalent radicals:

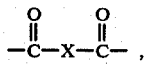   (A)

(B) at least one of —O—Y—O— and —O—CH$_2$—CH$_2$—O—CH$_2$—CH$_2$—O—, and

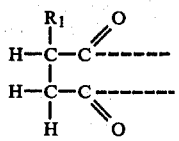   (C)

wherein X is comprised of at least 65 mole % of a divalent p-phenylene radical and 0 to 35 mole % of at least one divalent radical selected from m-phenylene, 2,6-naphthylene, 5-sodiosulfo-1,3-phenylene, and divalent cycloaliphatic radicals and primary aliphatic hydrocarbon radicals containing 2 to 34 carbon atoms, Y is a divalent aliphatic or cycloaliphatic radical containing 2 to 8 carbon atoms, and $R_1$ is selected from alkyl or 1-alkenyl radicals containing 3 to 30 carbon atoms, and wherein said copolyester is further characterized in that radical (A) is present in the amount of 98 to 60 mole percent, radical (B) is derived from at least 100 mole percent 1,6 hexanediol and radical (C) is present in the amount of about 2 to about 40 mole percent.

These new copolyesters are readily prepared using typical polycondensation reaction conditions. They may be prepared by either batch or continuous processes.

Typical polyesterification catalysts which may be used include titanium alkoxides, dibutyl tin dilaurate, and combinations of zinc, manganese, or magnesium acetates or benzoates with antimony oxide or antimony triacetate.

Useful polymers may have inherent viscosities ranging from about 0.4 to about 1.2, but preferred polymers have I.V. values ranging from about 0.5 to about 1.1. Inherent viscosities are determined at 25° C. in a 60/40 weight mixture of phenol/tetrachloroethane at a concentration of 0.5 g./100 ml.

We have found that it is generally possible to include from about 2 to about 40 mole percent of the alkyl or alkenylsuccinic anhydride in the polyesters of this invention. Preferred concentrations of the succinic anhydrides would include from about 3 to about 30 mole percent.

One of the advantages of the polyesters of our invention is that they can be used to bond fabrics at relatively low temperatures and the bonded fabrics have good resistance to typical laundering procedures. Also the copolyesters have much lower melt viscosities than similar polyesters which do not contain the substituted succinic anhydride moieties. The copolyesters may be used in powder form for fusible interlining fabrics, applied in hot melt form from extruders or gear pump applicators, or extruded into film or fiber form for use in laminating or bonding substrates. The copolyesters may also be melt blown into nonwoven webs which may be used to laminate fabrics or other articles.

Substituted succinic anhydrides useful in our invention include those containing straight chain or branched chain alkyl or akenyl groups containing 3 to about 30 carbon atoms. For example, useful succinic anhydrides include propylsuccinic anhydride, octylsuccinic anhydride, octenylsuccinic anhydride, isooctylsuccinic anhydride, dodecylsuccinic anhydride, octadecylsuccinic anhydride, octadecenylsuccinic anhydride, triacontylsuccinic anhydride, and the like.

The copolyesters of this invention also contain suitable amounts of aromatic, cycloaliphatic or aliphatic dibasic acids and one or more selected aliphatic or cycloaliphatic glycols. Dibasic acids suitable for use in our invention include terephthalic, isophthalic, 5-sulfoisophthalic (the sulfonic acid group is neutralized with an alkali metal), 1,4-cyclohexanedicarboxylic, 1,3-cyclohexanedicarboxylic, 1,2-cyclohexanedicarboxylic, glutaric, adipic, pimelic, suberic, azelaic, sebacic, 1,12-dodecandedioic, dimer acid, and the like.

Glycols useful in our invention include ethylene glycol, 1,3-propanediol, propylene glycol, 1,4-butanediol, 1,5-pentanediol, 1,6-hexanediol, 1,8-octanediol, 1,4-cyclohexanedimethanol, 1,3-cyclohexanedimethanol, 2,2-dimethyl-1,3-propanediol, 2,2,4,4-tetramethyl-1,3-cyclobutanediol, diethylene glycol, and the like.

When major amounts of terephthalic or hexahydroterephthalic acid are present in the copolyester, the amount of ethylene glycol, 1,4-butanediol, and 1,4-cyclohexanedimethanol must be limited in order to maintain the melting point of the polymer in a desirable range. In a preferred embodiment of the invention, the polyesters are based on 1,6-hexanediol or mixtures of 1,6-hexanediol with ethylene glycol, 1,4-butanediol, or 1,4-cyclohexanedimethanol, and the like.

This invention will be further illustrated by the following examples although it will be understood that these examples are included merely for purposes of illustration and are not intended to limit the scope of the invention.

These examples describe the preparation of copolymers of our invention and some of the uses for which the copolymers are particularly suited.

EXAMPLE 1

A total of 77.6 grams (0.4 mole) of dimethyl terephthalate, 80.24 g. (0.68 mole) of 1,6-hexanediol, 28.8 g. (0.32 mole) of 1,4-butanediol, 29.6 g. (0.1 mole) of tetradecylsuccinic anhydride, and 100 ppm of titanium catalyst (titanium isopropoxide in n-butanol) are weighed into a 500 ml. single-neck round-bottom flask equipped with a nitrogen inlet, stirrer, vacuum outlet, and a condensing flask. The flask is heated at 200° C. in a Belmont metal bath for one hour with a nitrogen sweep over the reaction mixture. After one hour the temperature of the bath is increased to 210° C. for 1 hour. When the theoretical amount of methanol has distilled from the reaction mixture, the metal bath temperature is increased to 260° C. and the pressure in the flask is reduced to about 0.1 mm. of mercury. The flask is heated at 260° C. at about 0.1 mm. pressure for 1 hour and 15 minutes. The flask is then removed from the bath and is allowed to cool under a nitrogen atmosphere as the polyester crystallizes. Analysis of the polymer by NMR indicates that it is a poly(hexamethylene terephthalate) copolyester containing 26 mole percent 1,4-butanediol moiety and 20 mole percent tetradecylsuccinic anhydride moiety. The polymer is an opaque, white color and has an I.V. of 0.6.

The polymer has a melt viscosity of 36,500 cp. at 190° C. (by ASTM D-1238 method). By DSC analysis the polymer has a glass transition temperature ($T_g$) of $-1°$ C. and a melting point ($T_m$) of 100° C. [heat of fusion ($\Delta H_f$) is 6.3 cal./g.].

The above material is readily dissolved in methylene chloride. Films (3 to 4 mils when dry) of the material are cast from the methylene chloride solution. The films are white and opaque and are very flexible. The films are used to bond 65/35 polyester/cotton fabric (twill weave) using a Sentinel heat sealer at 110° C. and 15 psi. for 2 seconds. The bonded specimens have an initial T-peel strength of 9.1 lb./in.-width [measured at 23° C. (after bonds have aged for 25 hours at 23° C.) using a peel rate of 2 inches per minute]. After laundering bonds at 60° C. (140° F.) for either 5 or 20 cycles, the bonds have T-peel strengths of 6.4 lb./in.-width and 6.2 lb./in.-width, respectively.

A sample of the copolymer is melt blown onto a steel mandrel to provide a nonwoven web of adhesive having a weight of 20 g./yd$^2$. This non-woven web is used to bond 65/35 polyester/cotton fabric to itself in a Sentinel heat sealer at 160° C.

EXAMPLE 2

A total of 72.75 g. (0.375 mole) of dimethyl terephthalate, 19.4 g. (0.10 mole) of dimethyl isophthalate, 80.24 g. (0.68 mole) of 1,6-hexanediol, 28.8 g. (0.32 mole) of 1,4-butanediol, 7.4 g. (0.025 mole) of tetradecylsuccinic anhydride, and 100 ppm titanium catalyst (titanium isopropoxide catalyst solution in n-butanol) are weighed into a 500 ml single-neck round-bottom flask equipped with a nitrogen inlet, stirrer, vacuum outlet, and a condensing flask. The flask is heated at 200° C. in a Belmont metal bath for 1 hour with a nitrogen sweep over the reaction mixture. After 1 hour the temperature is increased to 210° C. for 1 hour. When the theoretical amount of methanol has distilled from the reaction mixture, the metal bath temperature is increased to 260° C. and the pressure in the flask is reduced to about 0.1 mm. of mercury. The flask is heated at 260° C. (0.1 mm. pressure) for 75 minutes. The flask is then removed from the bath and is allowed to cool under a nitrogen atmosphere as the polyester crystallizes.

NMR analysis of the polymer indicates it to be a poly(hexamethylene terephthalate) copolyester containing 20 mole percent isophthalic acid moiety, 21 mole percent 1,4-butanediol moiety, and 5 mole percent tetradecylsuccinic anhydride moiety.

The polymer is an opaque, white color. It has an I.V. of 0.64 and a melt viscosity of 83,000 cp. at 190° C. (by ASTM D-1238 method). By DSC analysis, the polymer has a $T_g$ of 5° C. and a $T_m$ of 95° C. (total $\Delta H_f = 6.6$ cal./g.). Using the procedure in Example 1, films (3 to 4 mils thick) of the polymer are made. Fabric bonds made with the films of this polymer on polyester/cotton fabric (bonding conditions = 110° C./4 sec./15 psi.) have initial T-peel strengths of 15.3 lb./in.-width. After laundering fabric bonds for 5 and 20 cycles at 60° C., bond T-peel strengths of 12.8 and 8.2 lb./in.-width, respectively, are obtained.

EXAMPLE 3

The procedure of Example 2 is repeated except that 14.8 g. (0.05 mole) of tetradecylsuccinic anhydride are used. NMR analysis of the polymer indicates it to be a poly(hexamethylene terephthalate) copolyester containing 20 mole percent isophthalic acid moiety, 25 mole percent 1,4-butanediol moiety, and 10 mole percent tetradecylsuccinic anhydride moiety. The polymer is an opaque, white color. It has an I.V. of 0.63 and a melt viscosity of 50,600 cp. at 190° C. (by ASTM D-1238 method). By DSC analysis, the polymer has a $T_g$ of $-1°$ C. and a $T_m$ of 89° C. ($\Delta H_f = 4.8$ cal./g.). Fabric bonds made with films of this copolymer on polyester/cotton fabric (bonding conditions = 130° C./2 sec./15 psi.) have initial T-peel strengths of 11.7 lb./in.-width. After laundering fabric bonds for 5 and 20 cycles at 60° C., bond T-peel strengths of 9.5 and 8.4 lb./in.-width, respectively, are obtained.

EXAMPLE 4

A total of 92.15 g. (0.475 mole) of dimethyl terephthalate, 88.5 g. (0.75 mole) of 1,6-hexanediol, 5.3 g. (0.025 mole) of octylsuccinic anhydride, and 100 ppm of titanium catalyst (titanium isopropoxide catalyst solution in n-butanol) are weighed into a 500 ml. single-neck round-bottom flask equipped with a nitrogen inlet, stirrer, vacuum outlet, and condensing flask. The flask is heated at 200° C. in a Belmont metal bath for 1 hour with a nitrogen sweep over the reaction mixture. After one hour the temperature is increased to 210° C. for 1 hour. When the theoretical amount of methanol has distilled from the reaction mixture, the metal bath temperature is increased to 260° C. and the pressure of the flask is reduced to about 0.1 mm. of mercury. The flask is heated at 260° C. at about 0.1 mm. pressure for 1 hour and 15 minutes. The flask is then removed from the bath and allowed to cool under nitrogen as the polymer solidifies.

NMR analysis of the polymer indicates it to be a poly(hexamethylene terephthalate) copolyester containing 5 mole percent octylsuccinic anhydride moiety. The polymer is an opaque, white color. It has an I.V. of 0.52, a $T_g$ of 2° C., and a $T_m$ of 142° C. ($\Delta H_f = 10.5$ cal./g.). Fabric bonds made with films of this copolymer on polyester/cotton fabric (bonding conditions = 170° C./2 sec./15 psi.) have initial T-peel strengths of 9.1 lb./in.-width.

EXAMPLE 5

The procedure of Example 4 is repeated except that 17.55 g. (0.05 mole) of octadecenylsuccinic anhydride are used instead of the octylsuccinic anhydride. NMR analysis of the polymer indicates that it is a poly(hexamethylene terephthalate) copolyester containing 11 mole percent of octadecenylsuccinic anhydride moiety. The polymer has an I.V. of 0.5, a $T_g$ of 8° C., and a $T_m$ of 134° C. ($\Delta H_f = 9.0$ cal./g.). Fabric bonds made with films of this copolymer on polyester/cotton fabric (bonding conditions = 170° C./2 sec./15 psi.) have initial T-peel strengths of 4.7 lb./in.-width.

EXAMPLE 6

The procedure of Example 2 is repeated except that dimethyl terephthalate, octadecylsuccinic anhydride, 1,4-butanediol, and 1,6-hexanediol are used to prepare a copolyester containing 97 mole percent terephthalic acid moiety, 3 mole percent octadecylsuccinic anhydride moiety, 90 mole percent 1,4-butanediol moiety and 10 mole percent 1,6-hexanediol moiety. The copolymer has an I.V. of 1.04 and a melting point of 198° C. Films of the copolyester (3 to 4 mils thick) are useful in bonding polyester/cotton fabric.

EXAMPLE 7

The procedure of Example 2 is repeated except that dimethyl terephthalate, octadecylsuccinic anhydride, and 1,6-hexanediol are used to prepare a poly(hexamethylene terephthalate) copolyester containing 70 mole percent terephthalic acid moiety and 30 mole percent octadecylsuccinic anhydride moiety. The copolymer has an I.V. of 0.4 and a melting point of 94° C. Films of the copolyester (3 to 4 mils thick) are useful in bonding polyester/cotton fabric.

EXAMPLE 8

The procedure of Example 2 is repeated except that dimethyl terephthalate, 1,12-dodecanedioic acid, tetradecylsuccinic anhydride, and 1,6-hexanediol are used to prepare a poly(hexamethylene terephthalate) copolyester containing 92 mole percent terephthalic acid moiety, 5 mole percent 1,12-dodecanedioic acid moiety, and 3 mole percent tetradecylsuccinic anhydride moiety. The copolyester has an I.V. of 0.8 and a melting point of 138° C. Films of the copolyester (3 to 4 mils thick) are useful in bonding polyester/cotton fabric.

EXAMPLE 9

The procedure of Example 2 is repeated except that dimethyl terephthalate, octadecylsuccinic anhydride, 1,6-hexanediol, and ethylene glycol are used to prepare a poly(hexamethylene terephthalate) copolyester containing 90 mole percent terephthalic acid moiety, 10 mole percent octadecylsuccinic anhydride moiety, 90 mole percent 1,6-hexanediol moiety, and 10 mole percent ethylene glycol moiety. The copolyester has an I.V. of 0.53 and a melting point of 122° C. Films of the copolyester (3 to 4 mils thick) are useful in bonding polyester/cotton fabric.

In this application, the amount of a given constituent of a polymer is expressed as mole % of total acid moiety or mole % of total glycol moiety present.

The invention has been described in detail with particular reference to preferred embodiments thereof, but it will be understood that variations and modifications can be effected within the spirit and scope of the invention.

We claim:

1. A composition comprising a copolyester having a melting point of about 70° C. to about 200° C. and an inherent viscosity of about 0.4 to about 1.2, said copolyester containing the following divalent radicals:

(A)

(B) at least one of —O—Y—O— and —O—CH$_2$—CH$_2$—O—CH$_2$—CH$_2$—O—, and

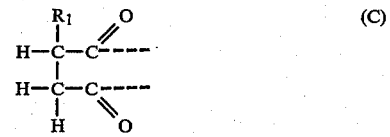

(C)

wherein X is comprised of at least 65 mole % of a divalent p-phenylene radical and 0 to 35 mole % of at least one divalent radical selected from m-phenylene, 2,6-naphthylene, 5-sodiosulfo-1,3-phenylene, and divalent cycloaliphatic radicals and primary aliphatic hydrocarbon radicals containing 2 to 34 carbon atoms, Y is a divalent aliphatic or cycloaliphatic radical containing 2 to 8 carbon atoms, and R$_1$ is selected from alkyl or 1-alkenyl radicals containing 3 to 30 carbon atoms, and wherein said copolyester is further characterized in that radical (A) is present in the amount of 98 to 60 mole percent, radical (B) is derived from at least 10 mole percent 1,6 hexanediol and radical (C) is in the amount of about 2 to about 40 mole percent.

2. Composition of claim 1 wherein radical (C) is present in the amount of about 3 to about 30 mole percent.

3. Composition of claim 2 wherein radical (C) is present in the amount of about 5 to 20 mole percent.

4. Composition of claim 1 wherein R$_1$ is a radical containing 8 to 18 carbon atoms.

* * * * *